United States Patent
Akkapeddi et al.

(10) Patent No.: US 12,200,010 B2
(45) Date of Patent: Jan. 14, 2025

(54) DOCUMENT RETENTION AND GENERATION AT THE EDGE

(71) Applicant: Bank of America Corporation, Charlotte, NC (US)

(72) Inventors: Naga Vamsi Krishna Akkapeddi, Charlotte, NC (US); Ron Papka, Short Hills, NJ (US); George Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 346 days.

(21) Appl. No.: 17/847,260

(22) Filed: Jun. 23, 2022

(65) Prior Publication Data
US 2023/0421605 A1    Dec. 28, 2023

(51) Int. Cl.
*H04L 9/40*    (2022.01)

(52) U.S. Cl.
CPC ...... *H04L 63/1475* (2013.01); *H04L 63/1433* (2013.01); *H04L 63/145* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 2013/0091570 A1* | 4/2013 | McCorkendale | ..... | H04L 63/145 726/23 |
| 2015/0089019 A1* | 3/2015 | Chou | ..... | G06F 16/178 709/217 |
| 2015/0089647 A1* | 3/2015 | Palumbo | ..... | G06F 21/564 726/23 |
| 2015/0237113 A1* | 8/2015 | Liu | ..... | H04L 67/02 709/203 |
| 2016/0191526 A1* | 6/2016 | Panchapakesan | ..... | H04L 63/10 726/1 |
| 2018/0232388 A1* | 8/2018 | Burns | ..... | H04L 67/06 |

* cited by examiner

*Primary Examiner* — Clayton R Williams
(74) *Attorney, Agent, or Firm* — Weiss & Arons LLP

(57) ABSTRACT

Methods for reducing storage demands at a centralized database and for reducing probability of a security breach such as an interception attack and a man-in-the-middle attack. Methods may include obtaining a document at the edge computing device. Methods may further include storing the document at the edge computing device. Methods may include executing, using a processor, on the edge computing device, a hashing algorithm on the document. Methods may include outputting, using the processor, a hash-value that is an outcome of the hashing algorithm, where the hash-value corresponds to the document. Methods may include transmitting, using the processor, the hash-value to the centralized database over a low bandwidth communication line while maintaining a storage of the hash-value at the edge computing device. Methods may include storing the hash-value at the centralized database. The hash-value may provide a condensed representation of the document.

21 Claims, 10 Drawing Sheets

DOCUMENT RETENTION AND GENERATION AT THE EDGE

FIELD OF TECHNOLOGY

Aspects of the disclosure relate to reducing probability of a compromise in security of a document in a network. Aspects of the disclosure relate to decreasing storage of a document at a centralized data repository in a network.

BACKGROUND OF THE DISCLOSURE

Entities such as corporations, hospitals, universities and other organizations manage large amounts of data in their repositories. This data includes documents, images and data profiles. Data may be received at most places in a network, for example, at edge computing devices. Often data is stored at a centralized data repository, which requires transmitting data through communication lines from the edge devices to the centralized data repository. Subsequently, when data is used for analysis, data needs to be transmitted across communication lines from the centralized data repository to edge devices. Storing large amounts of data at the centralized data repository places a storage burden on this repository. Transmitting data over long spatial distances can place an undue burden on an entity's communication lines, requiring high bandwidth and increasing latency. Further, repeated transmission of data increases a risk that data may be intercepted by those with malicious intent such as with man-in-the-middle attacks and interception attacks.

There is a need to minimize risks associated with transmitting data such as documents, images and data profiles across a network such as from an edge computing device to a centralized data repository, and from the centralized data repository to the edge computing device.

There is a further need to reduce the storage burden on centralized data repositories. This is especially the case when data is transmitted to and from the repositories, but not used at these repositories.

There is another need to reduce data transportation load on communication lines, for example, communication lines carrying data between an edge computing device and a centralized data repository. Sending large data files across communication lines may require high bandwidth lines, which can limit the utility of these expensive lines for other, critical data transmission.

There is a need to reduce risk of a security breach. Transmitting data, sometimes multiple times, on communication lines may open an entity to increased risk for a security breach. Two examples of security breaches that may occur when data is transmitted across communications lines are a man-in-the-middle attack and an interception attack. A man-in-the-middle attack is, for example, a type of eavesdropping attack, where attackers interrupt an existing conversation or data transfer. After inserting themselves in the "middle" of the transfer, the attackers pretend to be one or the other or both legitimate participants.

An interception attack allows unauthorized users to access data, applications, or environments, and are primarily an attack against confidentiality. Interception might take the form of unauthorized file viewing or copying, eavesdropping on phone conversations, or reading e-mail, and can be conducted against data at rest or in motion.

There is a further need to reduce latency experience by a user of an edge computing device. Latency may result when data is transmitted over long distances of communication lines.

SUMMARY OF THE DISCLOSURE

It is an object of the invention to minimize risks associated with transmitting data such as documents, images and data profiles across a network such as from an edge computing device to a centralized data repository, and from the centralized data repository to the edge computing device.

It is a further object of the invention to reduce the storage burden on centralized data repositories.

It is another object of the invention to reduce data transportation load on communication lines, for example, communication lines carrying data between an edge computing device and a centralized data repository.

It is an object of the invention to reduce risk of a security breach such as due to a man-in-the-middle attack and an interception attack.

It is a further object of the invention to reduce latency experience by a user of an edge computing device.

Apparatus and methods are herein provided to meet the above outlined objects of the invention.

The methods may be applied to reduce a probability of a compromise in security of a document and may reduce storage of documents at a centralized data repository. The methods may include obtaining the document at an edge computing device. Obtaining the document may include generating the document at the edge computing device. Obtaining the document may include receiving the document at the edge computing device. Receiving the document at the edge computing device may include receiving the document from another edge computing device, receiving the document from a customer, receiving the document as a picture, receiving the document as a scan and receiving the document as a hard copy. The methods may include storing the document at the edge computing device. The methods may include hashing the document at the edge computing device. The hashing may include using a processor on the edge computing device to execute a hashing algorithm on the document. The methods may further include outputting, using the processor, a hash-value. The hash-value may be the outcome of the hashing algorithm. The hash-value may correspond to the document stored at the edge computing device. The methods may further include using the processor to transmit the hash-value to the centralized data repository over a communication line. The communication line may be a low-bandwidth communication line. The methods may further include maintaining storage of the hash-value at the edge computing device. The methods may further include storing the hash-value at the centralized data repository. The hash-value may provide a condensed representation of the document.

The methods may further include associating a pointer to the hash-value. The pointer may include a pointer pointing to a memory address of where the document is stored on the edge computing device.

When a hash-value is transmitted to the centralized data repository, a pointer which is linked to the hash-value may also be transmitted to the centralized data repository.

The methods may include transmitting the hash-value from the edge computing device to the centralized data repository over a low bandwidth communication line. The low bandwidth communication line may be coaxial cable. The low bandwidth communication line may be a fiber optic cable. The low bandwidth communication line may be wireless. The low bandwidth communication line may transmit about 10 megabytes or less of data per second.

The methods may further include enriching the document which is stored on the edge computing device. The enrichment of the document may bring the document into conformance with a storage protocol of the centralized data repository.

The methods may further include receiving a request for the document. The request may come from the centralized data repository. The methods may further include receiving a request from the centralized data repository for a part of the document. The request may be made using the hash-value. The request may be made using the pointer. The methods may further include transmitting the document from the edge computing device to the centralized data repository. The methods may further include transmitting a part of the document from the edge computing device to the centralized data repository. The methods may include encrypting the document before transmitting the document. The methods may include encrypting part of the document before transmitting. The methods may include using the hash-value as a private key. Use of the private key may prevent a security breach. The methods may include deleting the document from the centralized data repository after a period of time.

The centralized data repository and the edge computing device may reside in a shared network. The shared network may contain additional computing devices besides the centralized data repository and the edge computing device. The shared network may provide for electronic communication among the edge computing devices, the centralized data repository and the additional computing devices.

It should be appreciated that storing the document at the edge computing device reduces the probability of a compromise in security of the document that might take place during transmission of the document to a centralized data repository. Examples of such a security risk when transmitting a document are an interception attack and a man-in-the-middle attack.

BRIEF DESCRIPTION OF THE DRAWINGS

The objects and advantages of this disclosure will be apparent upon consideration of the following detailed description, taken in conjunction with the accompanying illustrative drawings, in which like reference characters refer to like parts throughout, and in which.

DETAILED DESCRIPTION OF THE DISCLOSURE

Figure 1:
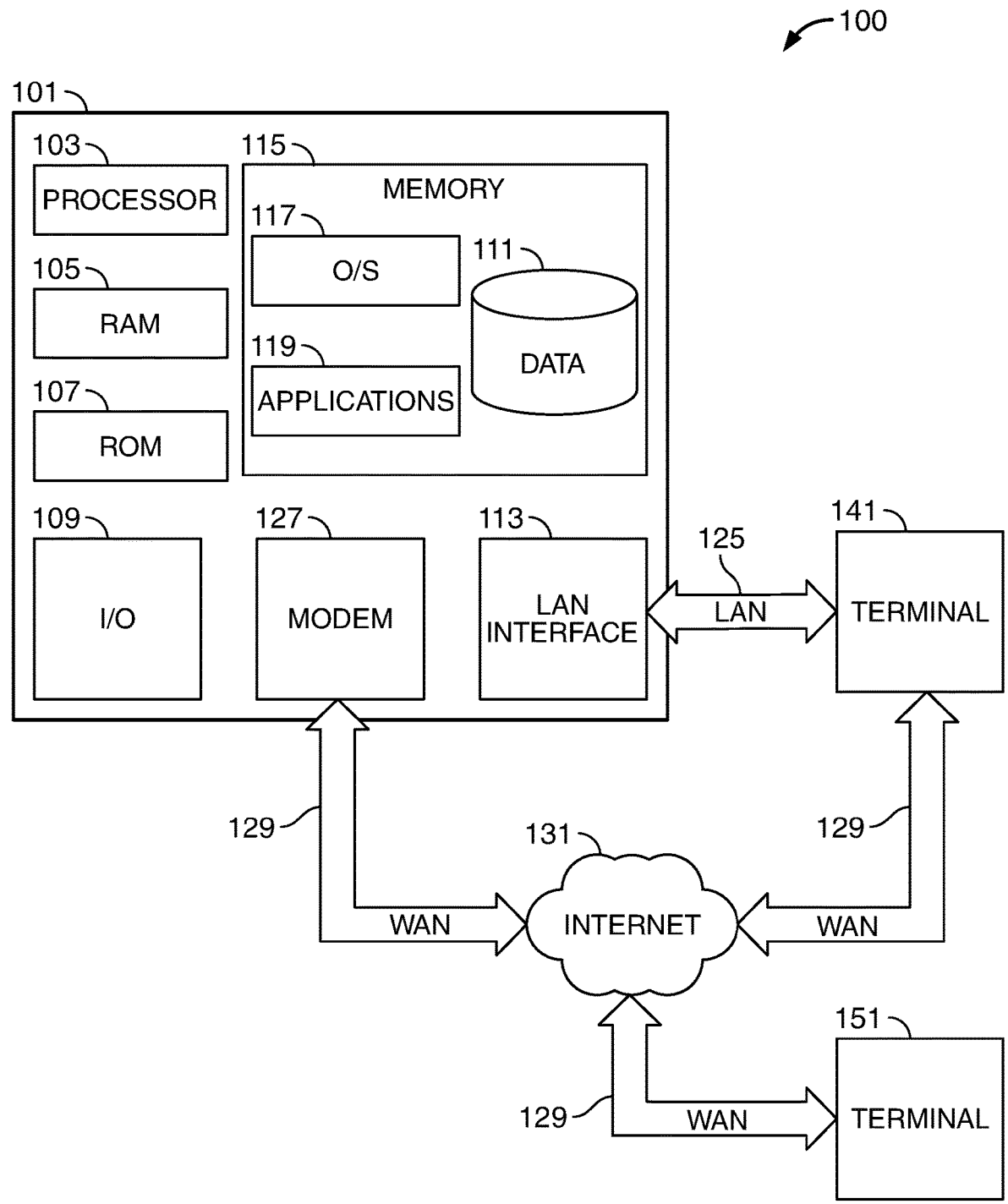
FIG. 1 is a block diagram of apparatus in accordance with principles of the disclosure.

An edge computing device may be in an infrastructure separate from a centralized data repository. An edge computing device may provide computing and storage services for real-time data analysis and low-latency network transport between a network edge and computer resources. A network edge may be an architectural demarcation point used to identify physical locations where an entity's corporate network connects to third-party networks. Entity-client interactions may take place on an edge computing device at a network edge. Storing data, such as in the form of a document, at an edge computing device may be advantageous. It may facilitate faster analysis of the document on that edge computing device or on another edge computing device in proximity. Working with devices near each other may provide for low-latency computing.

An edge computing device may be a device that utilizes edge computing. Edge computing may be an infrastructure separate from a core network. Edge computing may provide computing and storage services for more real-time data analysis and lower latency network transport between the users of the network such as a client and computer resources. Devices utilizing edge computing may be in telecommunication contact with the core network.

Entities such as corporations, hospitals, universities and other organizations create, edit and store hundreds of documents within their systems. These documents may be generated at an edge of a network and transmitted to a centralized data repository. Transmitting documents over the network entails a risk in a breach of security, for example, an interception attack or a man-in-the-middle attack. Storing documents at the centralized data repository may place a strain on the memory at the repository and increase latency for edge-based computing. It may be desirable to keep the storage of the documents on an edge computing device, closer to where the document may one day be needed. Storing the document at an edge computing device also may reduce the probability of a breach in security, especially when the edge computing device where the document is being stored is relatively close in the network to where the document was received or generated.

Apparatus and methods for reducing probability of a compromise in security of a document and for reducing storage of the document at a centralized data repository are provided.

The apparatus, also called a system, may include an edge computing device which is configured to obtain and store a document. The edge computing device may obtain the document by generating the document at the edge computing device. The edge computing device may obtain the document by processes other than generating the document. The edge computing device may obtain the document by receiving the document from a source other than the edge computing device. The document may be generated or received in a plain-text format. The document may be generated or received as a Word® document. The document may be generated or received as a PDF document. The document may be generated or received as an image such as a .jpeg. The document may be received as an electronic mail communication. The document may be received as a populated input from a graphical user interface (GUI) on a webpage. The document may be received as a populated input from a GUI on an application, for example, an application on a smartphone. The document may be received as a scan.

The edge computing device may be a computer such as a desktop or laptop computer. The edge computing device may be smartphone or tablet device. The edge computing device may be a user terminal found in a commercial establishment. The edge computing device may be any other personal computing device.

The edge computing device may be a data repository. The edge computing device may be an enterprise data storage entity. The edge computing device may be a data warehouse. The edge computing device may be an enterprise data warehouse. The edge computing device may be a data mart. The edge computing device may be any other data storage device.

Storing data such as a document in an edge computing infrastructure may provide benefits such as increased security, real-time data analysis, and lower latency network transport between clients and computer resources as compared to computing with devices located in a network core. In edge computing, having computer devices and data closer to a user may decrease the probability of a security breach, such as from an interception attack and a man-in-the-middle attack. "Closer" and "further" in the context of a network may refer to a physical distance between computer devices. "Closer" and "further" in the context of a network may refer to computing distance, such as the number of computing devices or telecommunication transfers between a user and the resources they are using.

The edge computing device may be configured to assign an identifier to the document. A processor on the edge computing device may be configured to assign an identifier to the document. An identifier may be hash-value of the document. An identifier may be metadata associated with the document. An identifier may be a text conversion of the document.

The hash-value may be derived by executing, using a processor on the computing device, a hashing algorithm on the document. There are multiple types of hashing algorithms. Exemplary algorithms that may be used to perform these functions may be one of, but not limited to, Message Digest 5 (MD5) and Secure Hashing Algorithm (SHA) 1 and 2. Following the executing of the hashing algorithm, the processor may output a hash-value. Hashing may be performed on small amounts of data as well as large amounts of data. A hash-value may be a random alphanumerical string generated from hashing the text in the document. A hash-value may also be referred to as a "digital fingerprint" or "digital DNA." Like DNA where a large biological variation may be caused by a small change in DNA, any slight change in data of a document may result in a dramatic difference in the resulting hash-value.

The metadata of the document may refer to extra information that is carried along with the document that makes it easier to use and find. Metadata for a document may include, among other data, file name, creation date, author, a thumbnail image, file size, file location in a storage system, location of the computer where generated, and revision history.

Production of the text conversion of a document may use, for example, optical character recognition or optical character reader (OCR). OCR is the electronic or mechanical conversion of images of typed, handwritten or printed text into machine-encoded text, whether from a scanned document, a photo of a document, a scene-photo (for example, text on signs and billboards in a landscape photo) or from subtitle text superimposed on an image (for example, from a captioned television broadcast).

The apparatus may include a centralized data repository. The centralized data repository may be located in a network. A centralized data repository may be able to store in its electronic memory data from one or more edge computing devices. Data may include a document. Data may include an identifier assigned to the document. The centralized data repository may be a locally based storage of memory. The centralized data repository may be based in the cloud. The cloud may encompass a global network of servers, each of which may have a unique function. The network may include remote servers, possibly located around the globe, while integrated together to operate as a single ecosystem.

The network may be a computer network. A computer network may be a set of computers sharing resources located on or provided by network nodes. The computers may use common communication protocols over digital interconnections to communicate with each other. The apparatus may contain a communication line between the edge computing device and the centralized data repository. The communication line may use communication protocols over digital interconnections to communicate. The interconnections may utilize telecommunication network technologies. The interconnections may be based on physically wired, optical, and wireless radio-frequency methods arranged in a variety of network topologies. A document may be transmitted over the communication line. An identifier of the document may be transmitted over the communication line.

The communication line may have a bandwidth such as a network bandwidth. A network bandwidth may be a measurement indicating the maximum capacity of a wired or wireless communications link to transmit data over a network connection in a given amount of time. Bandwidth may be represented in the number of bits, kilobits, megabits or gigabits that can be transmitted in a second. Bandwidth may be associated with speed of communication for a given amount of data. A communication line with a larger bandwidth may be able to transmit a given amount of data more quickly than a communication line with a smaller bandwidth. A larger document may require a larger bandwidth communication line to transmit the document in the same amount of time as a smaller document being transmitted over a small bandwidth communication line. It may be advantageous to create small identifiers for large documents to reduce the bandwidth requirements on the communication line.

The communication line may be a low bandwidth communication line. The communication line may be a high bandwidth communication line. The communication line may have a bandwidth that is moderate, for example, it is between low bandwidth and high bandwidth. Low bandwidth may be characterized by a transmission rate of about 10 megabytes or less of data per second. Low bandwidth may be characterized by a transmission rate of about megabytes or less of data per second. Low bandwidth may be characterized by a transmission rate of about 1.2 megabytes or less of data per second. Moderate bandwidth may be characterized by a transmission rate of about a gigabyte or less of data per second. Moderate bandwidth may be characterized by a transmission rate of about 500 megabytes or less of data per second. Moderate bandwidth may be characterized by a transmission rate of about 100 megabytes or less data per second. High bandwidth may be characterized by a transmission rate of greater than about a gigabyte of data per second.

In one aspect of the disclosure, an identifier may be transmitted over the communication line to a centralized data repository, keeping the storage of the document at an edge computing device. Transmitting the identifier may only require the use of a low bandwidth communication line. Furthermore, if the identifier is stored at the centralized data repository, its storage will occupy a small amount of memory. Additionally, if the communication of the identifier is compromised or intercepted, for example, by an interception attack or a man-in-the-middle attack, the risk is low, as the confidentiality of the information contained in the document may still be preserved. Keeping the document at an edge computing device may allow for real-time access to the document data by the edge computing device where the document is stored or by other edge computing devices in proximity.

However, if the document, rather than the identifier, were transmitted over the communication line, the line may need to be a moderate or high bandwidth communication line. Further, if the document were stored at the centralized data repository, it may occupy more memory than the identifier. Additionally, if the document is intercepted on its way to the centralized data repository, the confidentiality of the contents of the document may be compromised.

There may be situations that necessitate transmission of the document from the edge computing device to the centralized data repository. Even in these circumstances, initial transmission of an identifier over the communication line to the centralized data repository may have advantages. Sometimes, only sections of the document may need to be transmitted, for example, a sub-document. If the sub-document is transmitted instead of the full document, several advantages may be realized. Due to the small file size, less bandwidth may be required on the communication line and less storage demand at the centralized data repository may be required. Additionally, for the sections of the document that are not sent, there is a reduction of security concern. Further, there may be a delay time between when the identifier was sent and when the document is sent. In the interim, sensitivity of the data in the document may have become less critical.

The document may be stored on the edge computing device. The processor may be on the edge computing device. The processor may be configured to associate an identifier with the document. The identifier may be a hash-value of the document. The processor may be further configured to associate a pointer with the hash-value. The identifier may be metadata of the document. The processor may be further configured to associate a pointer with the metadata. The identifier may be a text conversion of the document. Production of the text conversion may have been facilitated by OCR. The processor may be further configured to associate a pointer with the text conversion. The pointer may point to a memory address of where the document is stored.

The Apparatus may include one edge computing devices or a multiple of edge computing devices configured for storing a document. The multiple edge computing devices may be in proximity to each other. The multiple edge computing devices may be in closer proximity to each other than to a centralized data repository. This closeness may be in terms of physical distance. This closeness may be in terms of computing distance.

The Apparatus may include the processor being located on the edge computing device. The processor may be configured to execute a hashing algorithm on the document and to output a hash-value, the hash-value being an outcome of the hashing algorithm, and to associate the hash-value of the document with the document, where the hash-value may be the identifier. The processor may be configured to associate a pointer with the hash-value. The pointer may point to a memory address of where the document is stored on the edge computing device. The low bandwidth communication line may be configured to transmit the hash-value and the pointer to the centralized data repository from the edge computing device. The centralized data repository may be configured to store the hash-value and the pointer.

The processor may be configured to identify metadata associated with the document, where the metadata may be the identifier. The processor may be configured to associate a pointer with the metadata. The pointer may point to the memory address of where the document is stored on the edge computing device. The low bandwidth communication line may be configured to transmit the metadata and the pointer to the centralized data repository from the edge computing device. The centralized data repository may be configured to store the metadata and the pointer.

The processor may be configured to produce a text conversion of the document, where the text conversion may be the identifier. The processor may be configured to associate a pointer with the text conversion. The pointer may point to the memory address of where the document is stored on the edge computing device. The low bandwidth communication line may be configured to transmit the text conversion and the pointer to the centralized data repository from the edge computing device. The centralized data repository may be configured to store the text conversion and the pointer.

Illustrative embodiments of apparatus and methods in accordance with the principles of the invention will now be described with reference to the accompanying illustrative drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all the features of the illustrative apparatus and/or some or all the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or "computing device." Computer 101 may be a workstation, desktop, laptop, tablet, smart phone, or any other suitable computing device. Elements of system 100, including computer 101, may be used to implement various aspects of the systems and methods disclosed herein. (Each of the apparatus illustrated in FIGS. 3-5 and 9-11 and/or described herewith, including Hash Table 302, Edge Computing Device 304, hashing algorithm processor 404 and centralized data repository 930, may include some or all of the elements and apparatus of system 100.)

Computer 101 may have processor 103 for controlling operation of the device and its associated components, and may include RAM 105, ROM 107, input/output module 109, and non-transitory/non-volatile machine-readable/writeable memory 115. Machine-readable/writeable memory may be configured to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be comprised of any suitable permanent storage technology—e.g., a hard drive. Memory 115 may store software including operating system 117 and application program(s) 119 along with any data 111 needed for operation of system 100. Memory 115 may also store videos, text, and/or audio assistance files. Data stored in memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. I/O 109 may also include one or more speakers for providing audio output and a video display device for providing textual, audio, audiovisual, and/or graphical output. The input and/or output may be related to computer application functionality.

System 100 may be connected to other systems via local area network (LAN) interface (or adapter) 113. System 100 may operate in a networked environment supporting connections to one or more remote computers, such as terminals 141 and 151. Terminals 141 and 151 may be personal computers or servers that include many or all of the elements described above relative to system 100. Network connections depicted in FIG. 1 include a local area network (LAN) 125 and a wide area network (WAN) 129 but may also include other networks. When used in a LAN networking environment, computer 101 is connected to LAN 125 through LAN interface (or adapter) 113. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may alternatively be referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with database 111, and any other suitable information, may be stored in memory 115. One or more of application program(s) 119 may include one or more algorithms that may be used to implement features of the disclosure comprising the crawling of data repositories, the hashing of the documents, the sharing of documents between users while maintaining security of the documents and the deleting and transferring of documents within and between data repositories.

The invention may be described in the context of computer-executable instructions, such as application program(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
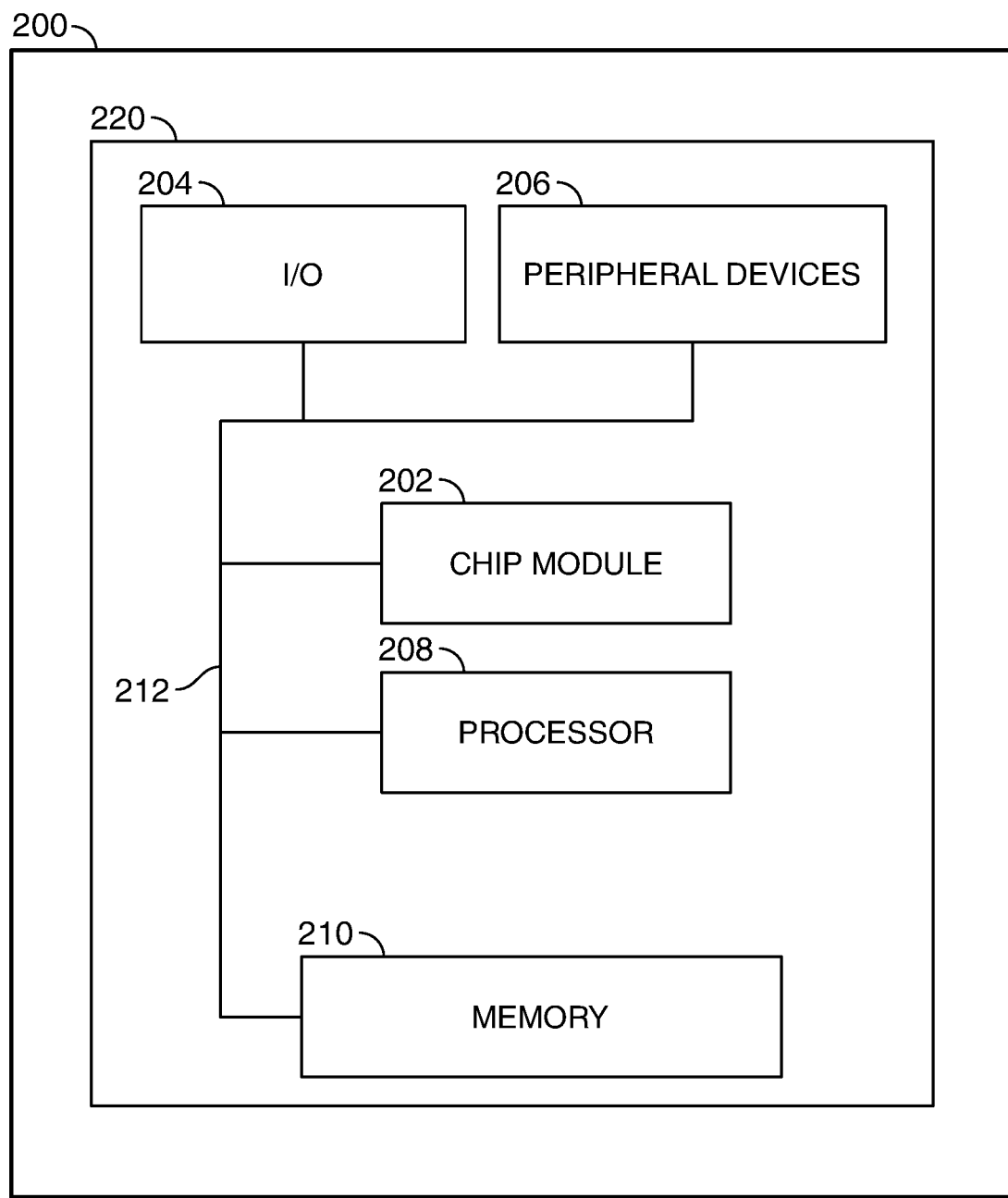
FIG. 2 is another block diagram of apparatus in accordance with principles of the disclosure.

FIG. 2 shows an illustrative block diagram of apparatus 200 that may be configured in accordance with the principles of the disclosure. Apparatus 200 may be a computing device. (Apparatus 200 may include one or more features of the apparatus shown in FIGS. 3-5 and 9-11 and/or described herewith, including Hash Table 302, Edge Computing Device 304, hashing algorithm processor 404 and centralized data repository 930, and may include some or all of the elements and apparatus of system 100 shown in FIG. 1.) Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of data; and machine-readable/writeable memory 210.

Machine-readable/writeable memory 210 may be configured to store information in machine-readable/writeable data structures, such as: machine executable instructions (which may be alternatively referred to herein as "computer instructions" or "computer code"); applications, signals; and/or any other suitable information or data structures.

Components 202, 204, 206, 208 and 210 may be coupled together by system bus (or other interconnections) 212 and may be present on one or more than one circuit board 220. In some embodiments, the components may be integrated into a single chip. The chip may be silicon-based.

Figure 3:
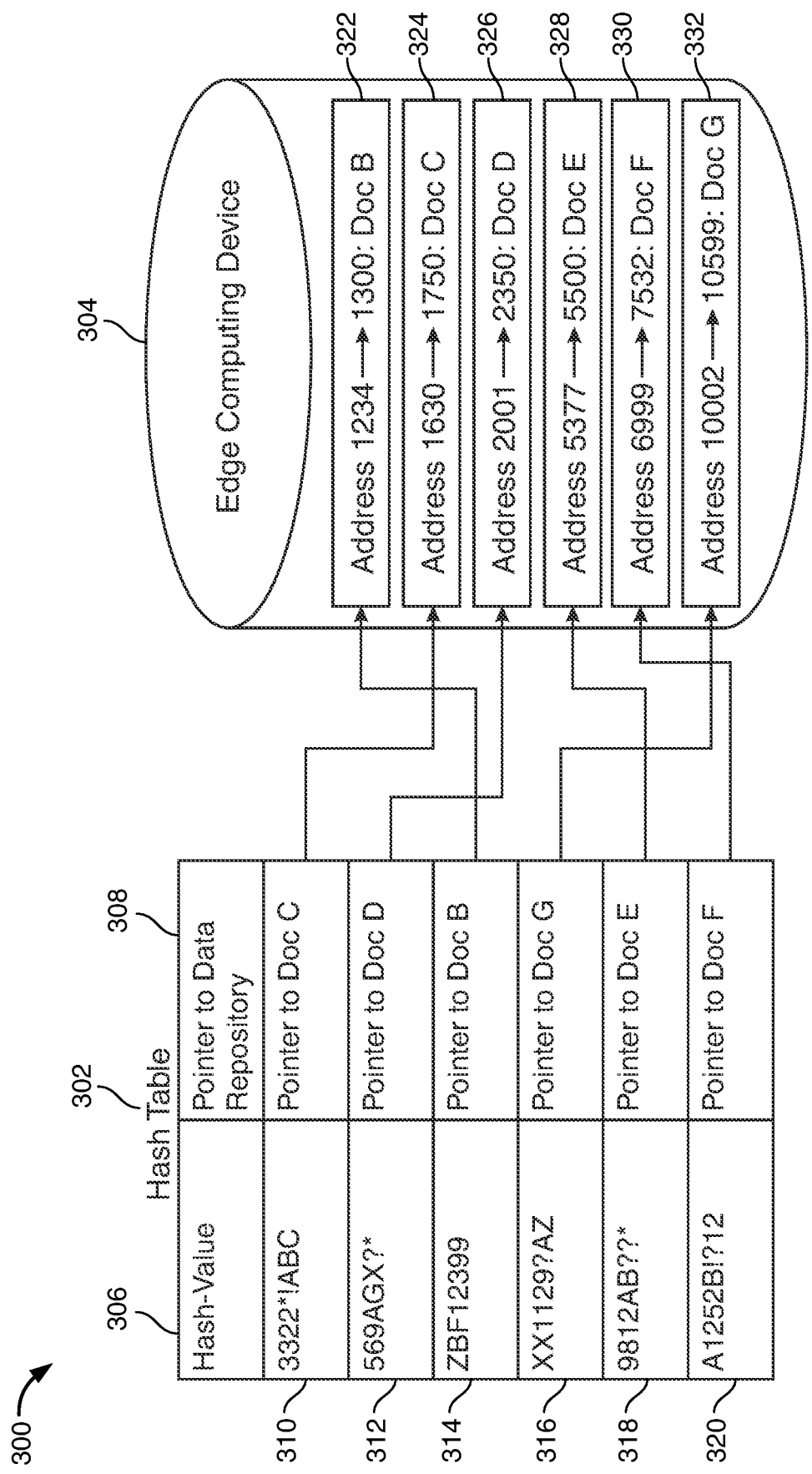
FIG. 3 is a diagram of apparatus in accordance with principles of the disclosure.

FIG. 3 shows an illustrative diagram 300. Diagram 300 includes an Edge Computing Device 304. Edge Computing Device 304 may be a database for storing documents associated with the entity. Edge Computing Device 304 may be a memory storage device for storing documents associated with edge computing in the network. Each of the documents may be stored at a memory address within Edge Computing Device 304. The memory address may be the location where the actual document is stored within Edge Computing Device 304.

Each of documents Doc B, Doc C, Doc D, Doc E, Doc F, and Doc G shown stored, respectively, at memory addresses 322, 324, 326, 328, 330 and 332, may also be represented in Hash Table 302 by a hash-value recorded in column 306 of Hash Table 302. A hash-value and any associated pointer in Hash Table 302 may require significantly smaller memory storage allocation than the corresponding document.

In row 310, the hash-value of Doc C is recorded in column 306 along with a column 308 pointer to the memory address of the location of storage of Doc C. In row 312, the hash-value of Doc D is shown recorded in column 306 along with a column 308 pointer to the memory address of the location of storage of Doc D. In row 314, the hash-value of Doc B is shown recorded in column 306 along with a column 308 pointer to the memory address of the location of storage of Doc B. In row 316, the hash-value of Doc G is shown recorded in column 306 along with a column 308 pointer to the memory address of the location of storage of Doc G. In row 318, the hash-value of Doc E is shown recorded in column 306 along with a column 308 pointer to the memory address of the location of storage of Doc E. In row 320, the hash-value of Doc F is shown recorded in column 306 along with a column 308 pointer to the memory address of the location of storage of Doc F.

Each of the hash-values shown recorded at column 306 is unique, with no duplicate hash-values, indicative of each of the documents corresponding to the hash-values being unique. Each of documents stored at 322-332 may be single-copy documents, with no duplicate documents among them.

There may be numerous additional documents (not shown in diagram 300) stored in Edge Computing Device 304, along with corresponding hash-values recorded in Hash Table 302.

Figure 4:
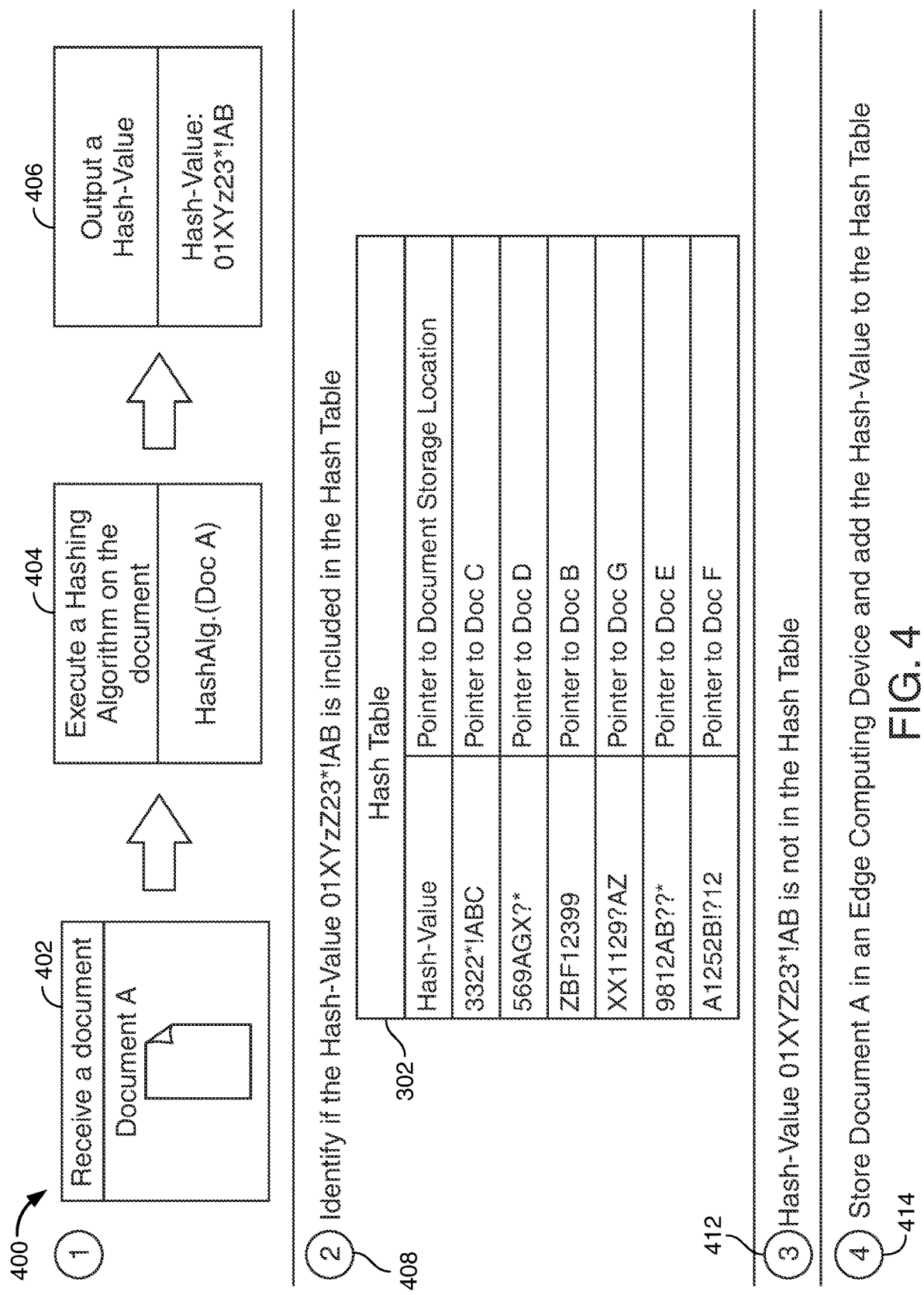
FIG. 4 is another diagram of apparatus in accordance with principles of the disclosure.

FIG. 4 shows an illustrative diagram of hash-based document system 400 for identifying new documents and previously stored documents. System 400 may include Hash Table 302 (described above in description of FIG. 3) and Edge Computing Device 304 (shown in FIG. 3 and described above). System 400 may be used to execute a process beginning at 402, where a document may be received. The document in this example is 'Document A.' 'Document A' may be received from a client. 'Document A' may be received from a user of system 400.

At 404, a hashing algorithm may be executed on 'Document A.' The hashing algorithm may be executed to identify whether 'Document A' has already been stored in the system.

At 406, an output of the hashing algorithm executed on 'Document A' may be outputted as a hash-value. The outputted hash-value of 'Document A' is shown as '01XYz23*!AB.' System 400 may be configured to perform a search at Hash Table 302 to determine if hash-value '01XYz23*!AB' is already recorded in Hash Table 302, as shown at 408. As shown at 408, Hash Table 302 contains no record hash-value '01XYz23*!AB.'

At 412, after performance of the search, system 400 is shown to have determined that hash-value '01XYz23*!AB' is not recorded in Hash Table 302. Based on hash-value '01XYz23*!AB' not being recorded in Hash Table 302, system 400 may determine that 'Document A' does not yet exist in system 400.

Figure 5:
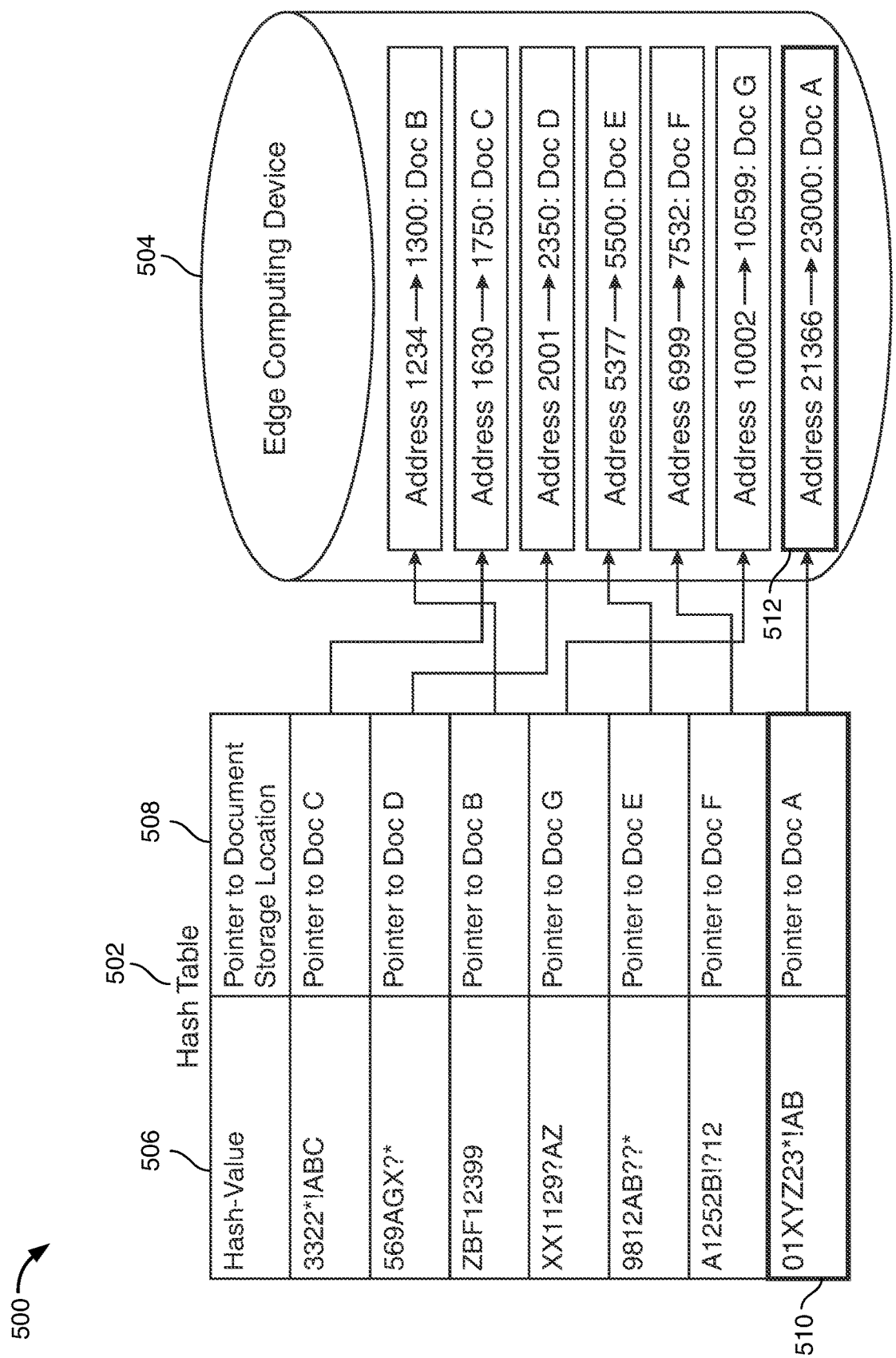
FIG. 5 is yet another diagram of apparatus in accordance with principles of the disclosure.

As shown at 414, system 400 may be configured to store 'Document A' in an available memory address of Edge Computing Device 304 and to add to Hash Table 302 hash-value '01XYz23*!AB' (as well as a pointer to the memory address of the location of storage of 'Document A' in Edge Computing Device 304), as depicted in FIG. 5 that follows.

FIG. 5 shows an illustrative diagram 500 that reflects results of process steps of FIG. 4. Edge Computing Device 504 is shown including the same memory storage locations and associated stored documents of Edge Computing Device 304 (shown in FIG. 3), with an additional memory storage location and associated stored document in Edge Computing Device 504. Hash Table 502 is shown including the same data included in Hash Table 302 (shown in FIGS. 3 and 4), with an additional hash-value and pointer stored at Hash Table 502.

As depicted in FIG. 5, 'Document A' ("Doc A") is stored in memory address 512 of Edge Computing Device 504, 'Address 21366-23000'; in row 510 of Hash Table 502, hash-value '01XYz23*!AB' of Doc A is recorded in column 506 along with a column 508 pointer to memory address 512 of Edge Computing Device 504.

Figure 6:
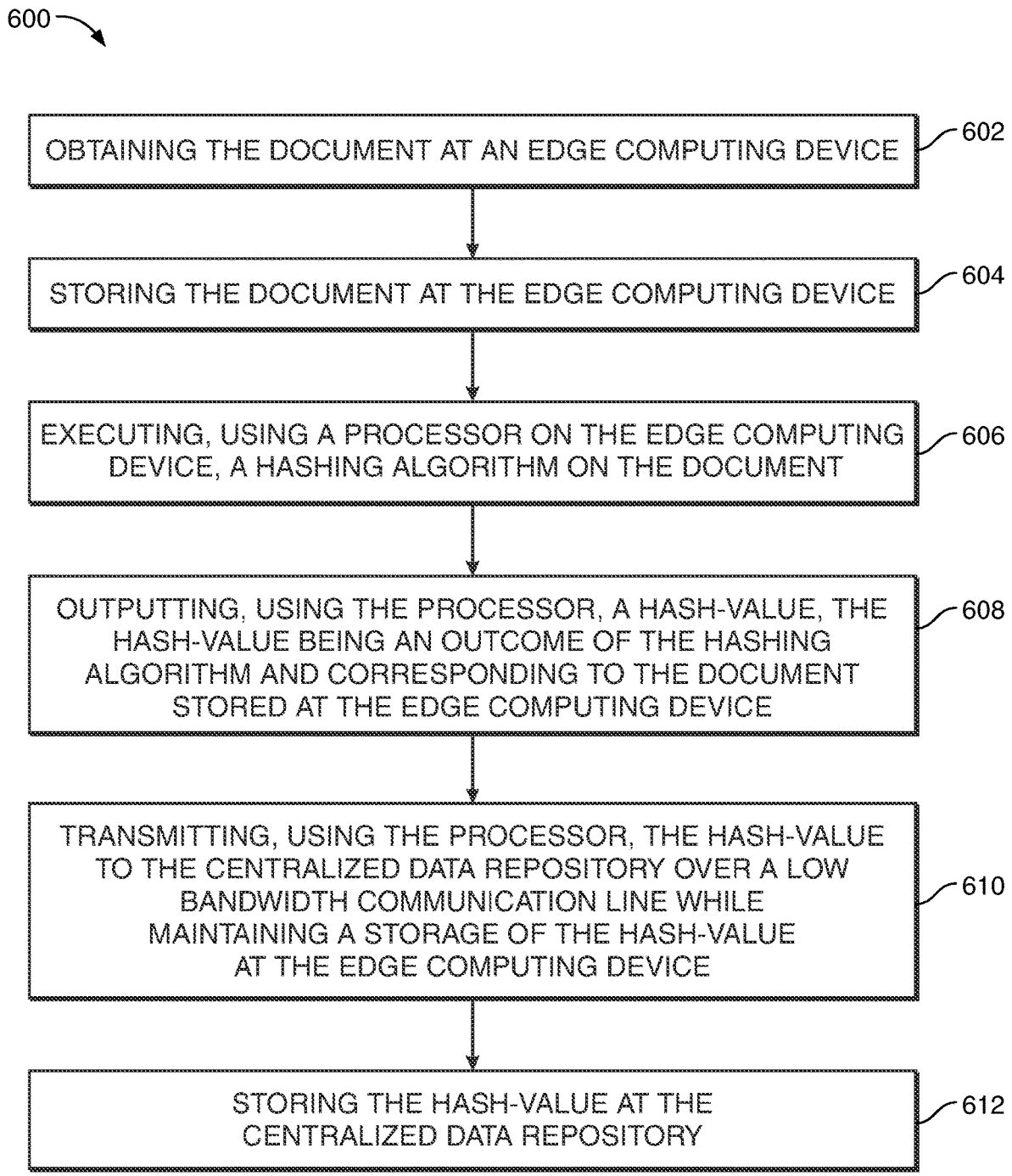
FIG. 6 is a flowchart of a process in accordance with principles of the disclosure.

FIG. 6 shows illustrative flow chart 600 of method steps for reducing probability of a compromise in security of a document and for reducing storage of a document at a centralized data repository.

Flow chart 600 is depicted as starting at step 602. At step 602, a document is obtained at an edge computing device. The document may be generated at the edge computing device or may be received at the edge computing device. At step 604, the document may be stored at the edge computing device. At step 606, a hashing algorithm may be executed on the document using a processor on the edge computing device.

At step 608, a hash-value of the document may be outputted by the processor as an outcome of the hashing algorithm, where the hash-value may correspond to the document stored at the edge computing device. Hash-values of unique documents processed at step 608 may themselves be unique.

At step 610, the hash-value may be transmitted using the processor to the centralized data repository over a low bandwidth communication line, while maintaining storage of the hash-value at the edge computing device. The edge computing device may maintain storage of the hash-value.

Flowchart 600 may conclude at step 612, where the hash-value may be stored at the centralized data repository.

Figure 7:
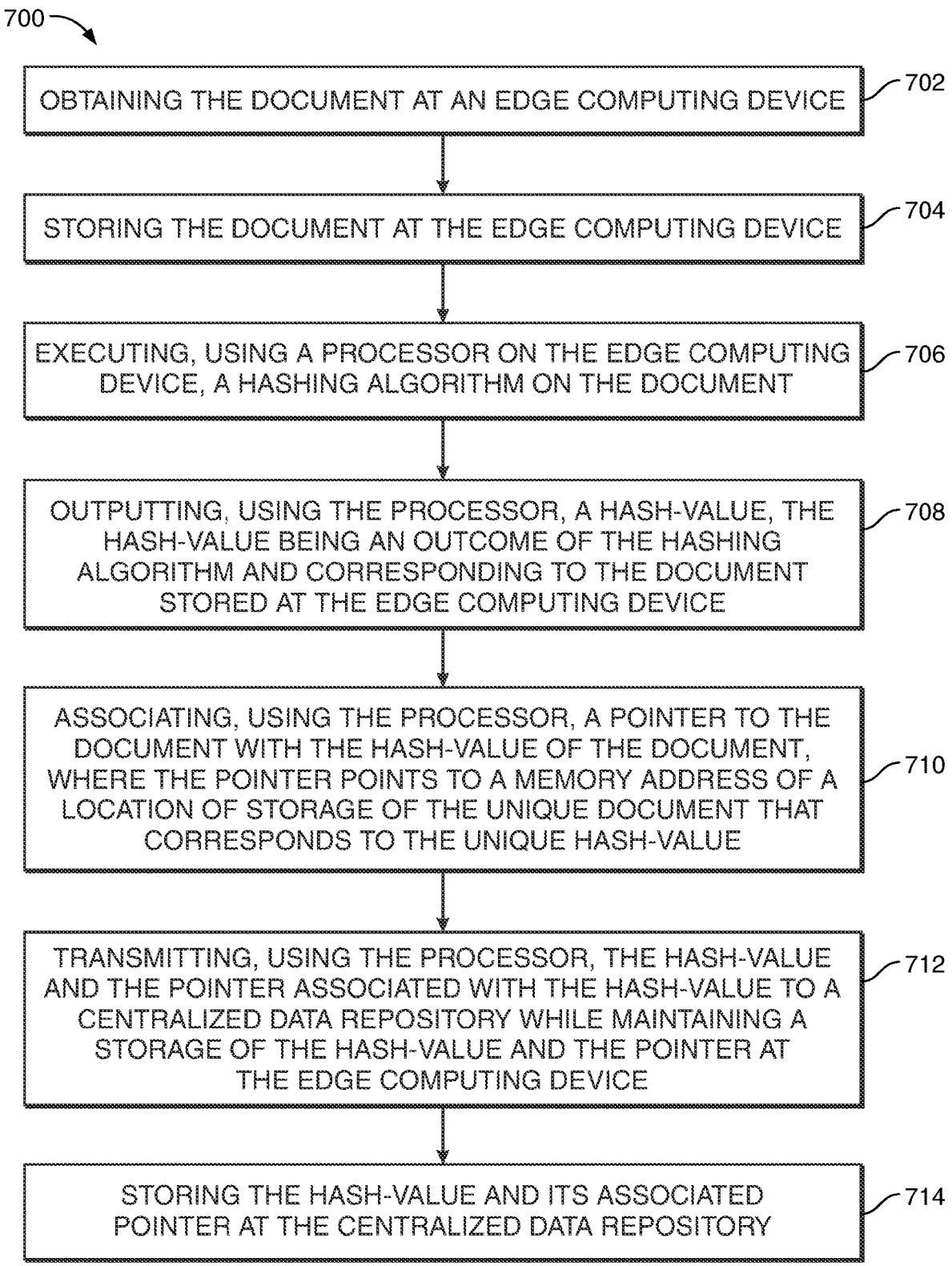
FIG. 7 is another flowchart of a process in accordance with principles of the disclosure.

FIG. 7 shows illustrative flow chart 700 of method steps for reducing a probability of a compromise in security of a document and for reducing storage of the document at a centralized data repository. Flow chart 700 is depicted as starting at step 702, with steps 702-708 being similar to steps 602-608 (shown in FIG. 6), respectively. Terms and processes presented in steps 702-708 may be similar in definition and/or function to those of terms and processes presented in steps 602-608.

At step 710, a pointer (alternatively, a "hash pointer") to the document is associated with the hash-value of the document, where the pointer points to a memory address of a location of storage of the unique document that corresponds to the unique hash-value.

At step 712, the hash-value and its associated pointer may be transmitted to the centralized data repository, while storage of the hash-value and its associated pointer may be maintained at the edge computing device.

Flowchart 700 may conclude at step 714, where the hash-value and its associated pointer may be stored at the centralized data repository.

Figure 8:
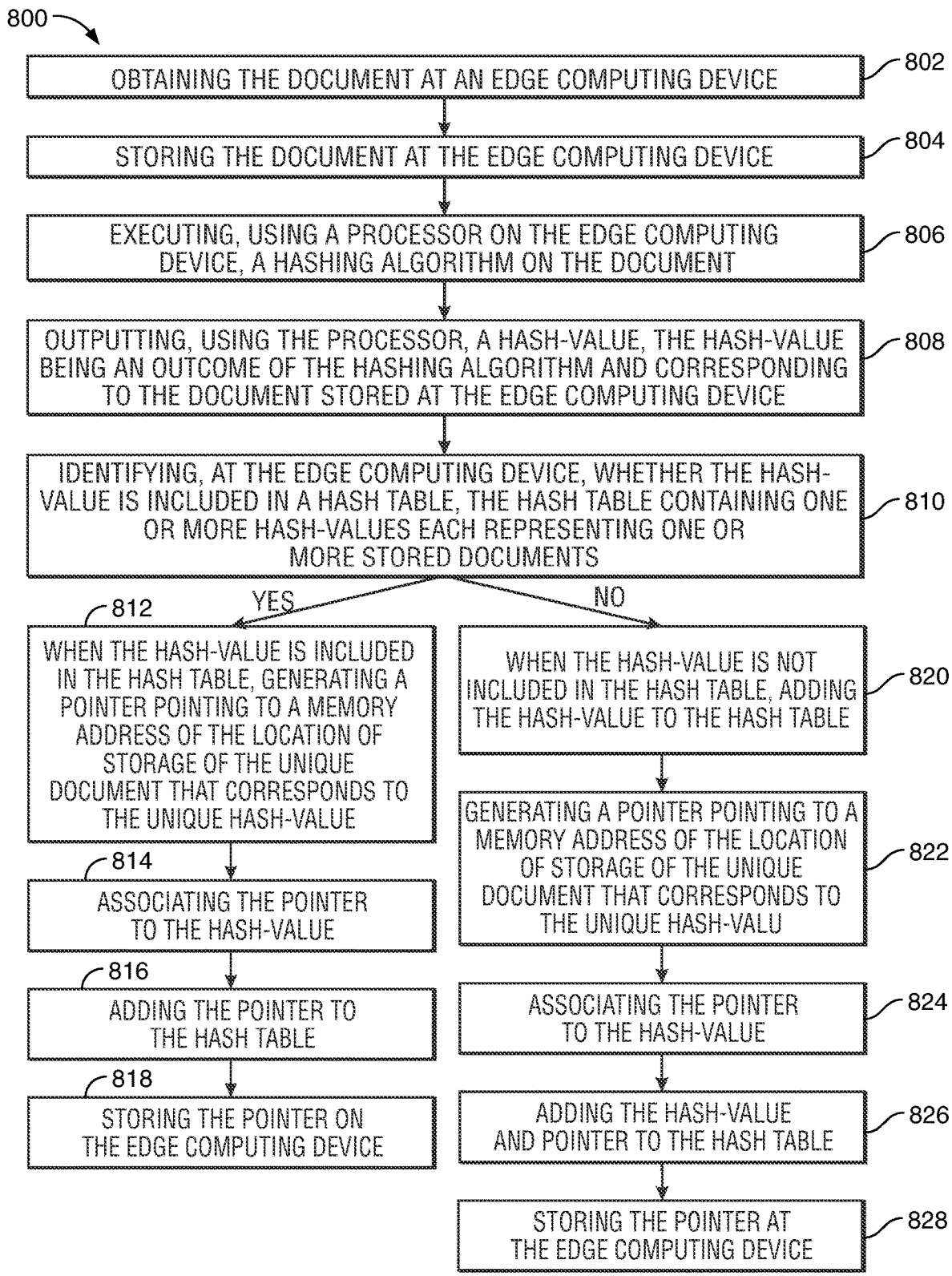
FIG. 8 is yet another flowchart of a process in accordance with principles of the disclosure.

FIG. 8 shows illustrative flow chart 800 of method steps for reducing probability of a compromise in security of a document and for reducing storage of the document at a centralized data repository. Flow chart 800 may illustrate a way of determining if a document is stored on an edge computing device or if the document is not stored at the edge computing device.

Flow chart 800 is depicted as starting at step 802, with steps 802-808 being similar to steps 602-608 (shown in FIG. 6), respectively. Terms and processes presented in steps 802-808 may be similar in definition and/or function to those of terms and processes presented in steps 602-608.

At step 810, it may be determined, at the edge computing device, whether the hash-value is included in a hash table, the hash table containing one or more hash-values, each representing one or more stored documents.

At step 812, a pointer may be generated, where the pointer points to a memory address of the location of storage of the unique document that corresponds to the unique hash-value. At step 814, the pointer is associated with the hash-value.

At step 816, the pointer is added to the hash table. At step 818, the pointer is stored on the edge computing device.

At 820, the hash-value is added to the hash table. At step 822, a pointer is generated which points to a memory address of the location of storage of the unique document that corresponds to the unique hash-value.

At step 824, the pointer is associated with the hash-value. At step 826, the pointer is added to the hash table. At step 828, the pointer is stored on the edge computing device.

Figure 9:
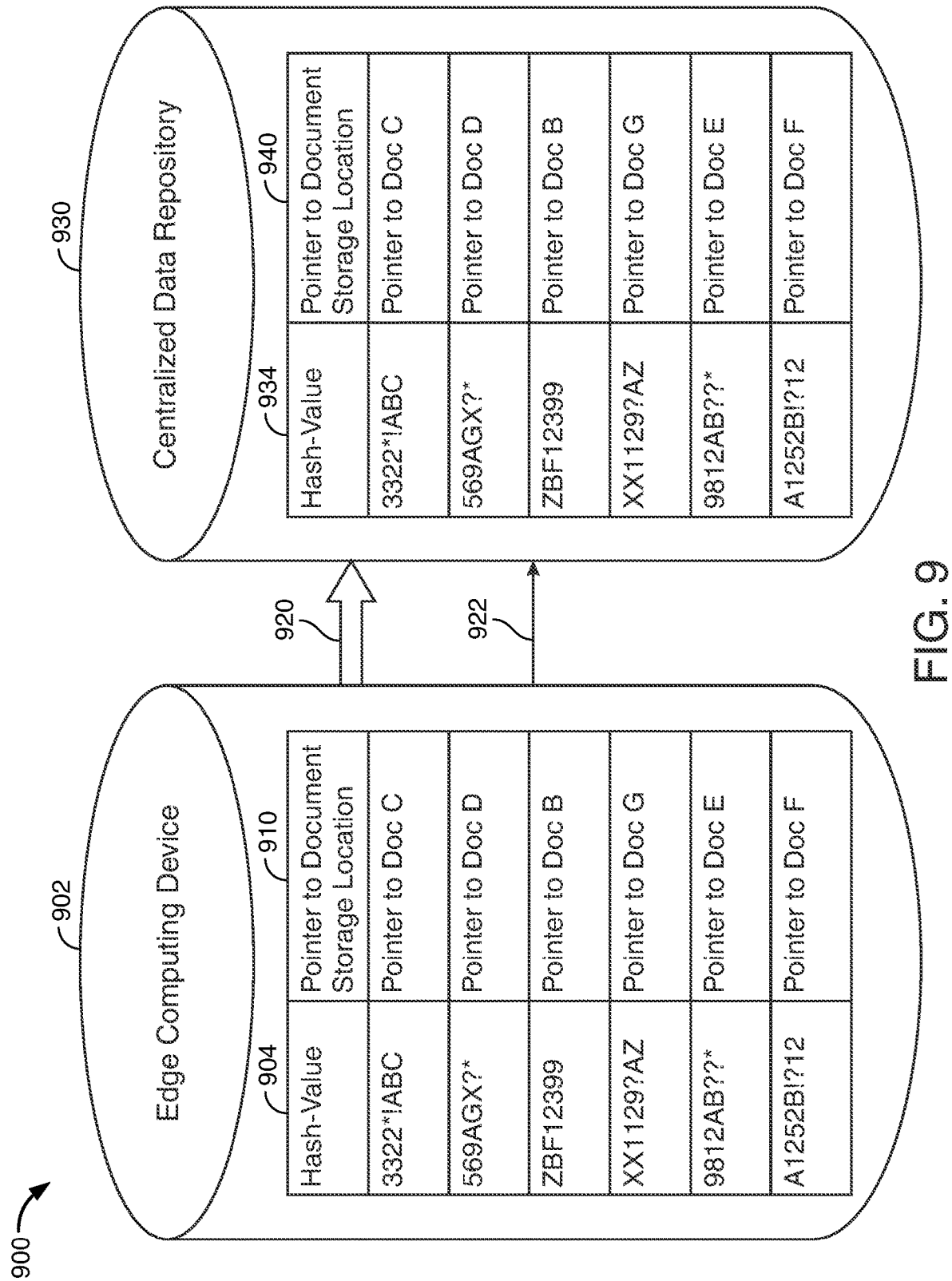
FIG. 9 is a diagram of apparatus in accordance with principles of the disclosure.

FIG. 9 shows an illustrative diagram 900 depicting a transfer of information between an edge computing device 902 and a centralized data repository 930. Edge computing device 902 may contain information about hash-values 904. The hash-value may be derived from executing a hashing algorithm on one or more than one document (not shown). The algorithm may follow steps congruent with those illustrated in FIG. 4, items 402, 404 and 406.

Each hash-value may be associated with a pointer to a document storage location 910. Hash-values 904, pointers 910, or both may be transmitted to a centralized data repository 930. This data transfer may take place over high bandwidth data line 920. The data transfer may take place over low bandwidth data line 922. When the data is transferred to the centralized data repository, hash-values 934, pointers 940 or both may be stored in the centralized data repository. Storage of hash-values 904 and pointers 910 may be maintained at the edge computing device.

It should be appreciated that transferring hash-values 904, pointers 910 or both, may require less bandwidth than transmitting the one or more than one document itself. It should be appreciated that transmitting only hash-values, pointers or both may reduce the size of data transmitted from an edge computing device to a centralized data repository. Transmitting less data may be associated with a lower security risk to various attacks, such as an interception attack or a man-in-the-middle attack, that may occur while data is in transit. Additionally, hash-values and pointers are not the data itself but are representations of the data and storage information about the data, so a loss would be minimized even if security of hash-values, storage information about them, or both was compromised.

Figure 10:
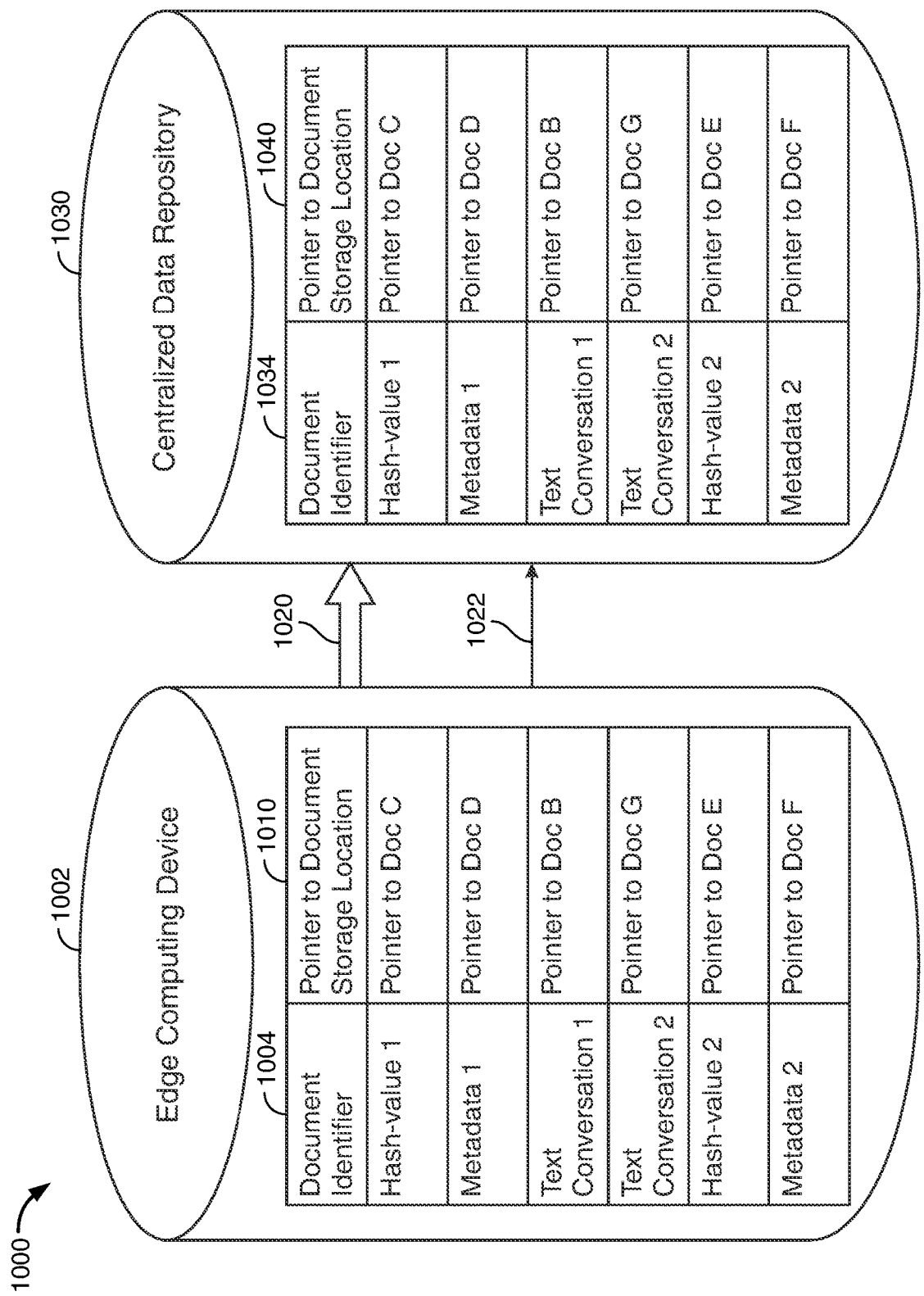
FIG. 10 is another diagram of apparatus in accordance with principles of the disclosure.

FIG. 10 shows an illustrative diagram 1000 depicting a transfer of information between edge computing device 1002 and a centralized data repository 1030. Edge computing device 1002 may contain information such as a hash-value, metadata and text conversion as found in document identifier column 1004. These values may be associated with pointers found in document storage location column 1010. Hash-value, metadata and text conversion may be transmitted to a centralized data repository 1030. This data transfer may take place over high bandwidth data line 1020. The data transfer may take place over low bandwidth data line 1022. When the data is transferred to the centralized data repository, hash-values 1004, pointers 1040 or both may be stored in centralized data repository 1030. Storage of hash-values 1004 and pointers to document storage locations 1010 may be maintained at the edge computing device.

It should be appreciated that transferring hash-values, metadata, or text conversions 1004, and pointers 1010 or both, may require less bandwidth than transmitting the one or more than one document itself. It should be appreciated that transmitting only hash-values, metadata, text conversions, pointers, or combinations thereof may reduce the size of data that may be transmitted from an edge computing device to a centralized data repository. Transmitting less data may be associated with a lower security risk to various attacks, such as an interception attack or a man-in-the-middle attack, that may occur while data is in transit. Additionally, hash-values, metadata, text conversions, and pointers are contain less data than the documents themselves, so a loss would be minimized even if security of hash-values, storage information about them, or both was compromised.

It should be appreciated that transferring a document between edge computing devices may offer a more secure data connection than between an edge computing device and a centralized data repository; for example, when edge computing devices are within close network communication with each other. It should be appreciated that transferring hash-values, metadata, text conversions, pointers to document storage locations or combinations thereof may require less bandwidth than transferring the document itself. It should be appreciated that only transferring hash-values, pointers to document storage locations or both may lead to less transfer of data from an edge computing device to a centralized data repository. Transferring less data may lead to less data having a security risk to various attacks such as an interception attack or a man-in-the-middle attack that may occur while data is in transit.

Thus, systems and methods for reducing a probability of a compromise in security of a document and for reducing storage of a document at a centralized data repository, are provided. Persons skilled in the art will appreciate that the present invention can be practiced by other than the described embodiments, which are presented for purposes of illustration rather than of limitation. The present invention is limited only by the claims that follow.

What is claimed is:

1. A method for reducing probability of a compromise in security of a document and for reducing storage of the document at a centralized data repository, the method comprising:
   obtaining the document at an edge computing device;
   storing the document at the edge computing device;
   executing, using a processor on the edge computing device, a hashing algorithm on the document;
   outputting, using the processor, a hash-value, the hash-value being an outcome of the hashing algorithm and corresponding to the document stored at the edge computing device;
   transmitting, using the processor, the hash-value to the centralized data repository over a communication line while maintaining storage of the hash-value at the edge computing device; and
   storing the hash-value at the centralized data repository;

wherein:
   the hash-value provides a condensed representation of the document;
   the communication line is a low bandwidth communication line; and
   the low bandwidth communication line transmits 10 megabytes or less of data per second.

2. The method of claim 1, wherein obtaining the document at the edge computing device comprises generating the document at the edge computing device.

3. The method of claim 1, wherein obtaining the document at the edge computing device comprises receiving the document at the edge computing device.

4. The method of claim 1, further comprising linking a pointer to the hash-value, where the pointer points to a memory address where the document is stored on the edge computing device, and transmitting the pointer to the centralized data repository when the hash-value is transmitted to the centralized data repository.

5. The method of claim 1, wherein the low bandwidth communication line is a coaxial cable.

6. The method of claim 1, wherein the low bandwidth communication line is a fiber optic cable.

7. The method of claim 1, wherein the low bandwidth communication line is wireless.

8. The method of claim 1, further comprising enriching the document stored at the edge to bring a format of the document into conformance with storage protocol of the centralized data repository.

9. The method of claim 1, further comprising receiving a request for a portion of data available in the document from the centralized data repository, and transmitting the portion of data to the centralized data repository.

10. The method of claim 1, further comprising:
    receiving a request for the document from the centralized data repository;
    encrypting the document, wherein the hash-value is used as a private key to grant access to the document; and
    transmitting the document to the centralized data repository.

11. The method of claim 1, wherein the edge computing device and the centralized data repository reside in a network, and
    the network is configured to facilitate secure electronic communication between the edge computing device and the centralized data repository.

12. The method of claim 1, wherein reducing probability of a compromise in security of the document comprises reducing probability of an interception attack.

13. The method of claim 1, wherein reducing probability of a compromise in security of the document comprises reducing probability of a man-in-the-middle attack.

14. A system for reducing probability of a compromise in security of a document and for reducing storage of the document at a centralized data repository, the system comprising:
    a processor configured to assign an identifier to the document;
    an edge computing device configured to obtain and store a document and to store an identifier assigned to the document;
    a centralized data repository configured to store the identifier assigned to the document; and
    a communication line between the edge computing device and the centralized data repository;
    wherein:
    the communication line is a low bandwidth communication line and is configured to transmit the identifier of the document to the centralized data repository from the edge computing device;

the transmission of the identifier over the low bandwidth communication line decreases a demand for a high bandwidth communication line;

the low bandwidth communication line has a transmission rate of 10 megabytes or less of data per second; and the high bandwidth communication line has a transmission rate of greater than a gigabyte of data per second.

15. The system of claim 14, wherein:

the processor is located on the edge computing device and is further configured to:

execute a hashing algorithm on the document;

output a hash-value, the hash-value being an outcome of the hashing algorithm;

associate the hash-value of the document with the document; and associate a pointer with the hash-value;

wherein:

the hash-value is the identifier;

the pointer points to a memory address of where the document is stored on the edge computing device;

the low bandwidth communication line is configured to transmit the hash-value and pointer to the centralized data repository from the edge computing device; and the centralized data repository is configured to store the hash-value and pointer.

16. The system of claim 14, wherein:

the processor is located on the edge computing device and is further configured to:

associate metadata of the document with the document; and associate a pointer with the metadata;

wherein:

the metadata is the identifier;

the pointer points to a memory address of where the document is stored on the edge computing device;

the low bandwidth communication line is configured to transmit the metadata and pointer to the centralized data repository from the edge computing device; and the centralized data repository is configured to store the metadata and pointer.

17. The system of claim 14, wherein:

the processor is located on the edge computing device and is further configured to:

execute an optical character recognition (OCR) algorithm on the document;

output a text conversion, the text conversion being an outcome of the OCR algorithm;

associate a text conversion of the document with the document; and associate a pointer with the text conversion;

wherein:

the text conversion is the identifier;

the pointer points to a memory address of where the document is stored on the edge computing device;

the low bandwidth communication line is configured to transmit the text conversion and pointer to the centralized data repository from the edge computing device; and the centralized data repository is configured to store the text conversion and pointer.

18. The system of claim 14, wherein reducing probability of a compromise in security of the document comprises reducing probability of an interception attack.

19. The system of claim 14, wherein reducing probability of a compromise in security of the document comprises reducing probability of a man-in-the-middle attack.

20. The system of claim 14, further comprising a network; wherein the edge computing device and the centralized data repository reside in the network, and the network is configured to facilitate secure electronic communication between the edge computing device and the centralized data repository.

21. A method for reducing probability of an interception attack and a man-in-the-middle attack and for reducing storage demands at a centralized database in a network, the method comprising:

obtaining a document at an edge computing device;

storing the document at the edge computing device;

executing, using a processor, on the edge computing device, a hashing algorithm on the document;

outputting, using the processor, a hash-value, the hash-value being an outcome of the hashing algorithm and corresponding to the document stored at the edge computing device;

transmitting, using the processor, the hash-value to the centralized data repository over a communication line while maintaining storage of the hash-value at the edge computing device; and storing the hash-value at the centralized database;

wherein:

the hash-value provides a condensed representation of the document, and the communication line is a low bandwidth communication line; and the low bandwidth communication line transmits 10 megabytes or less of data per second.

* * * * *